US008045562B2

(12) United States Patent
Lee et al.

(10) Patent No.: US 8,045,562 B2
(45) Date of Patent: Oct. 25, 2011

(54) ESTIMATING LINK INTERFERENCE AND BANDWIDTH

(75) Inventors: Jeongkeun Lee, Seoul (KR); Sung-Ju Lee, Los Altos, CA (US); Taekyoung Kwon, Seoul (KR)

(73) Assignee: Hewlett-Packard Development Company, L.P., Houston, TX (US)

( * ) Notice: Subject to any disclaimer, the term of this patent is extended or adjusted under 35 U.S.C. 154(b) by 835 days.

(21) Appl. No.: 11/590,148

(22) Filed: Oct. 31, 2006

(65) Prior Publication Data

US 2008/0101331 A1 May 1, 2008

(51) Int. Cl.
*H04L 12/56* (2006.01)
(52) U.S. Cl. ............... 370/395.41; 370/341; 370/338; 370/437; 370/445; 370/448; 370/477; 370/347; 370/322; 370/468; 455/63.1; 455/67.11; 455/37.13; 455/452.1; 455/464
(58) Field of Classification Search .............. 370/252, 370/255, 338, 350, 395.31, 400, 445, 456, 370/458–459, 347, 322, 395.41, 341, 437, 370/448, 477, 63.1, 67.11, 37.13, 452.1, 370/464; 455/1, 445, 450, 452.1–452.2, 455/453, 455–456.4, 509, 513, 516
See application file for complete search history.

(56) References Cited

U.S. PATENT DOCUMENTS

| | | | | |
|---|---|---|---|---|
| 6,381,464 | B1 * | 4/2002 | Vannucci | 455/456.1 |
| 7,092,732 | B2 * | 8/2006 | Tamaki et al. | 455/522 |
| 7,477,621 | B1 * | 1/2009 | Loc et al. | 370/329 |
| 2003/0072327 | A1 * | 4/2003 | Fodor et al. | 370/468 |
| 2005/0213547 | A1 * | 9/2005 | Meier | 370/338 |
| 2006/0147204 | A1 * | 7/2006 | Yasukawa et al. | 398/26 |
| 2006/0153081 | A1 * | 7/2006 | Simonsson et al. | 370/238 |

OTHER PUBLICATIONS

J. Padhye et al.,Estimation of Link Interference in Static Multi-hop Wireless Networks, Oct. 2005, ACM/USENIX/International Measurement Conference, Berkeley CA.*
A. Taniwala et al., Architecture and Algorithms for an IEEE 802.11-based Multi_Channel Wireless Mesh Network, 2005, IEEE INFOCOM.*
Bicket, J. et al., "Architecture and Evaluation of an Unplanned 802. 11b Mesh Network", ACM, MOBICOM'05, Sep. 2005.
Draves, R. et al., "Routing in Multi-Radio, Multi-Hop Wireless Mesh Networks", ACM, MOBICOM'04, Sep.-Oct. 2004.
Jain, K. et al., "Impact of Interference on Multi-hop Wireless Network Performance", ACM, MOBICOM'03, Sep. 2003.
Kyasanur, P. et al., "Multi-Channel Mesh Networks: Challenges and Protocols", downloaded Oct. 2, 2006.
Padhye, J. et al., "Estimation of Link Interference in Static Multi-Hop Wireless Networks", downloaded Oct. 2, 2006.
Papagiannaki, K. et al., "Experimental Characterization of Home Wireless Networks and Design Implications", downloaded Oct. 2, 2006.
Xu, K. et al., "How Effective is the IEEE 802.11 RTS/CTS Handshake in Ad Hoc Networks?", downloaded Oct. 2, 2006.
Zhou, G. et al., "RID: Radio Interference Detection in Wireless Sensor Networks", downloaded Oct. 2, 2006.

* cited by examiner

*Primary Examiner* — Patrick Edouard
*Assistant Examiner* — Fred Casca

(57) ABSTRACT

A carrier sense relationship and an interference relationship between logical links in a shared, broadcast, medium network are determined. Bandwidth for each of the links is estimated based on the carrier sense relationship and the interference relationship.

18 Claims, 7 Drawing Sheets

| INTER-FERENCE / CARRIER SENSING | UNIDIRECTIONAL INTERFERENCE: ONLY L1 IS INTERFERED BY L2 (L1:$F_Y$ / L2:$F_N$) | BIDIRECTIONAL INTERFERENCE: L1 AND L2 INTERFERE EACH OTHER L1:$F_Y$ / L2:$F_Y$ |
|---|---|---|
| L1:$C_N$ / L2:$C_Y$ | STATE 1 L1:$C_N F_Y$ / L2:$C_Y F_N$ | STATE 4 L1:$C_N F_Y$ / L2:$C_Y F_Y$ |
| L1:$C_Y$ / L2:$C_N$ | STATE 2 L1:$C_Y F_Y$ / L2:$C_N F_N$ | SYMMETRIC STATE 4 L1:$C_Y F_Y$ / L2:$C_N F_Y$ |
| L1:$C_N$ / L2:$C_N$ | STATE 3 L1:$C_N F_Y$ / L2:$C_N F_N$ | STATE 5 L1:$C_N F_Y$ / L2:$C_N F_Y$ |

FIG. 3

| INTERFERENCE<br>CARRIER SENSING | UNIDIRECTIONAL INTERFERENCE:<br>ONLY L₁ IS INTERFERED BY L₂<br>(L1:F_Y / L2:F_N) | BIDIRECTIONAL INTERFERENCE:<br>L1 AND L2 INTERFERE EACH OTHER<br>(L1:F_Y / L2:F_Y) |
|---|---|---|
| L1:C_N / L2:C_Y | STATE 1 (L1:C_NF_Y / L2:C_YF_N)<br>BIR = 0.6    LIR = 0.85 | STATE 4 (L1:C_NF_Y / L2:C_YF_Y)<br>BIR = 0.31    LIR = 0.6 |
| L1:C_Y / L2:C_N | STATE 2 (L1:C_YF_Y / L2:C_NF_N)<br>BIR = 0.59    LIR = 0.67 | |
| L1:C_N / L2:C_N | STATE 3 (L1:C_NF_Y / L2:C_NF_N)<br>BIR = 0.76    LIR = 0.86 | STATE 5 (L1:C_NF_Y / L2:C_NF_Y)<br>BIR = 0.25    LIR = 0.2 |

▨ TX throughput
☐ RX goodput

FIG. 5

ESTIMATING LINK INTERFERENCE AND BANDWIDTH

BACKGROUND

Wireless mesh networks (WMNs) are emerging as attractive solutions for last-mile broadband Internet access. A wireless mesh network is generally composed of wireless clients, a gateway portal that connects the mesh network to the Internet, and the mesh nodes that form the backbone. The mesh nodes wirelessly communicate with each other to provide Internet connectivity for the clients. Routes between the mesh nodes could be multihop.

WMNs aim to provide high-speed Internet service without costly network infrastructure deployment and maintenance. The main obstacle in achieving high-capacity wireless mesh networks is interference between the mesh links. However, estimating interference in multihop wireless links is a difficult task.

It has been proposed that interference may be estimated based on the distance between the nodes. However, measurement results show that distance does not have a strong correlation with the quality of wireless links. One reason is the asymmetric carrier sense (CS) relationship between nodes. That is, one sender senses the other sender's transmission but not vice versa, which may result in one node dominating the link. Another reason is the well known hidden interference or hidden node problem. The IEEE 802.11 standard suggests the use of RTS/CTS to solve the hidden interference problem. However, the RTS/CTS mechanism has been shown to be ineffective in eliminating the hidden node problem and fails to increase the multihop capacity of the link.

Link Interference Ratio (LIR) and Broadcast Interference Ratio (BIR) are measurement-based, instead of distance-based, schemes that estimate interference between two wireless links that do not share end-points. Both LIR and BIR, with different measurement complexities, estimate the amount of pairwise link interference. However, both BIR and LIR only indicate the aggregate throughput of the receivers for the two links in the presence of interference. BIR and LIR do not provide information on each link's throughput. Thus, situations where the aggregate throughput of two links is satisfactory but the throughput of one of the links is poor may not be detected when relying solely on BIR or LIR.

BRIEF DESCRIPTION OF THE DRAWINGS

Various features of the embodiments can be better appreciated, at the same time become better understood with reference to the following detailed description when considered in connection with the accompanying figures, in which:

FIG. 3 illustrates states for carrier sense and interference relationships between logical links, according to an embodiment;

FIG. 5 illustrates bandwidth measurements for the states when the links are unsaturated, according to an embodiment;

DETAILED DESCRIPTION OF THE EMBODIMENTS

In the following detailed description, references are made to the accompanying figures, which illustrate specific embodiments. Electrical, mechanical, logical and structural changes may be made to the embodiments without departing from the spirit and scope of the embodiments.

Figure 1:
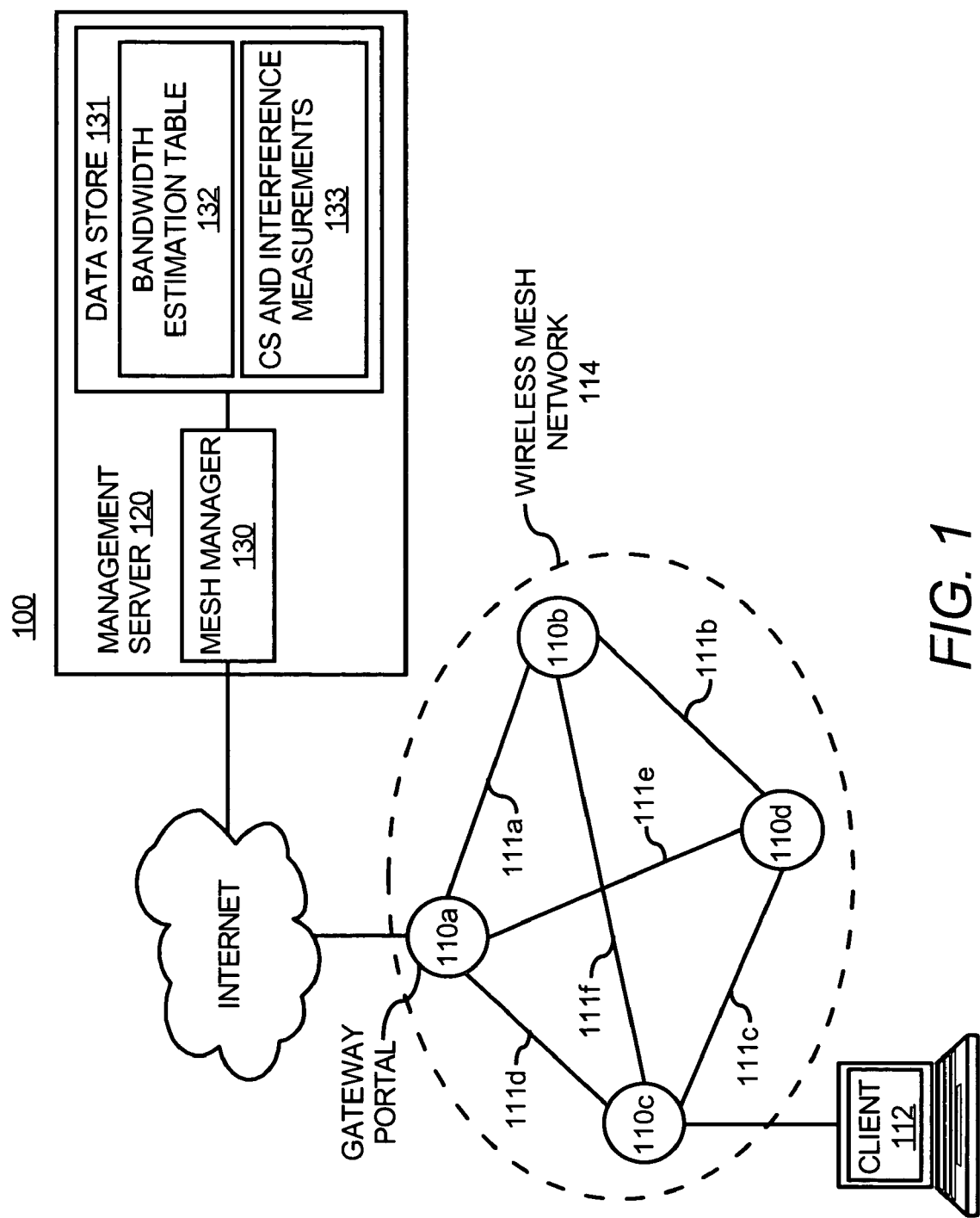
FIG. 1 illustrates a system including a WMN, according to an embodiment.

FIG. 1 illustrates a system 100 according to an embodiment. The system 100 comprises a WMN 114 connected to the Internet and a management server 120. The management server 120 includes a mesh manager 130 and a data store 131. The mesh manger 130 receives network metric measurements 133 from the mesh nodes in the WMN 114. The measurements 133 may be stored in the data store 131 along with a bandwidth estimation table 132. The mesh manager 130 is operable to characterize links in the WMN 114 in terms of carrier sense relationships and interference relationships based on the measurements 133, and estimate a bandwidth for the links based on the relationships using the bandwidth estimation table 132. The mesh manager 130 and bandwidth estimation is described in further detail below.

The management server 120 is shown in FIG. 1 in a network connected to the WMN 114 via the Internet by way of example and not limitation. One of ordinary skill in the art would readily recognize that the management server 120 may be provided in other locations, such as in the WMN 114, for example in a mesh node, or directly connected to the WMN 114, like a client.

The WMN 114 includes mesh nodes 110a-d that form the backbone for the WMN 114 and provide connectivity to the Internet for clients, such as the client 112. The mesh nodes 110a-d communicate with each other on a shared, broadcast wireless medium, and routes between them could be multi-hop. Typically paths between mesh nodes in a WMN are multihop, however, there may be situations where there is only one hop, such as a single link or path, between mesh nodes. Each mesh node has at least one interface for communicating with other mesh nodes. The interface may use a multihop, medium access control (MAC) protocol, such as 802.11a/b/g, for communicating with other mesh nodes. Mesh nodes may have a second interface for communicating with clients. A third interface may also be provided for communicating with a wired network. For example, at least one of the mesh nodes, such as the mesh node 110a, may be a gateway portal connecting the WMN 114 to the Internet. The mesh node 110a may be connected to a wired network that is connected to the Internet.

The mesh nodes 110a-d are typically routers or access points that are not mobile. However, the mesh nodes are generally a computer system with routing capability for routing data in the WMN 114.

Clients are connected to the WMN 114, for example, to get access to the Internet. FIG. 1 shows the client 112 connected to the mesh node 110c. A client may be a user device, such as a laptop, desktop, personal digital assistant, cellular phone, or other types of computer systems, including servers.

The WMN 114 provides multiple end-to-end paths, which may be multihop, for sending or receiving client data. For example, data from the client 112 may traverse nodes 110c and 110a via link 111d in one end-to-end path or may traverse nodes 110c, 110d and 110a via links 111c and 111e in another end-to-end path. Other end-to-end paths are also possible.

The mesh nodes 110a-d use a wireless transmission medium to transmit data in the WMN 114. The wireless medium may be a single channel. Thus, there is contention and interference between mesh nodes and links in the WMN 114. The mesh nodes 110a-d may use broadcast or unicast when transmitting data.

As described above, there may be multiple end-to-end paths between the client 112 and the mesh node 110a. Each path may include one or more links 110a-f. A link represents a path for data transmission between two mesh nodes, such as a sender and a receiver. The links are logical links and not physical links representing different channels. That is, if the wireless transmission medium is a single channel, then a logical link represents a path between the sender and the receiver when the sender gains access to the medium, whereby channel contention rules may be based on the MAC protocol used by the mesh nodes 110a-d. A channel in an 802.11 MAC protocol is a predetermined range of frequencies.

It will be apparent to one of ordinary skill in the art that the size of the WMN, in terms of number of mesh nodes or in terms of another metric, and the number of clients connected to the WMN may vary from shown in FIG. 1, and the embodiments described herein may be practiced in WMNs of different sizes or in other types of networks where there is interference between links.

As wireless mesh nodes typically have no mobility, interference is an obstacle in achieving high capacity. According to an embodiment, carrier sense (CS) relationships and interference relationships between logical links in the WMN 114 are determined and used to estimate bandwidth for the links in saturated or unsaturated cases. Bandwidth is a communication data rate. Bandwidth may be throughput or goodput. Throughput is the rate of bytes transmitted from a sender, whereas goodput is the rate of bytes received at a receiver. In the presence of interference, goodput is less than throughput because typically less packets are received than transmitted.

The bandwidth estimation applies to wireless networks that use a single radio and channel or applies to multi-channel and multi-radio networks where there is channel contention and interference. For example, a wireless network may use multiple channels. However, there still may be contention for one of the channels if multiple nodes are trying to access the channel at the same time. In another example, a wireless network may be a multi-radio system, and there may be contention between radios within range of each other and using the same channel. In these examples and other similar situations, the link bandwidth estimation described in the embodiments herein may be used. Furthermore, the link bandwidth estimation described in the embodiments herein may be used for wireless networks that are not WMNs. The link bandwidth estimation described in the embodiments herein is applicable to any shared broadcast medium wireless network where there are two links that do not share endpoints. The endpoints may be nodes in the wireless networks. A node may be a computer system with routing capability in the network, including but not limited to routers, access points, etc. Examples of the wireless networks include ad-hoc networks and other local area wireless networks.

FIG. 1 shows a centralized architecture for collecting network metric measurements, determining CS and interference relationships and estimating bandwidth. It will be apparent to one of ordinary skill in the art that a distributed architecture may be used, such as a computer system in the WMN 114 performing one or more of these functions.

Figure 2:
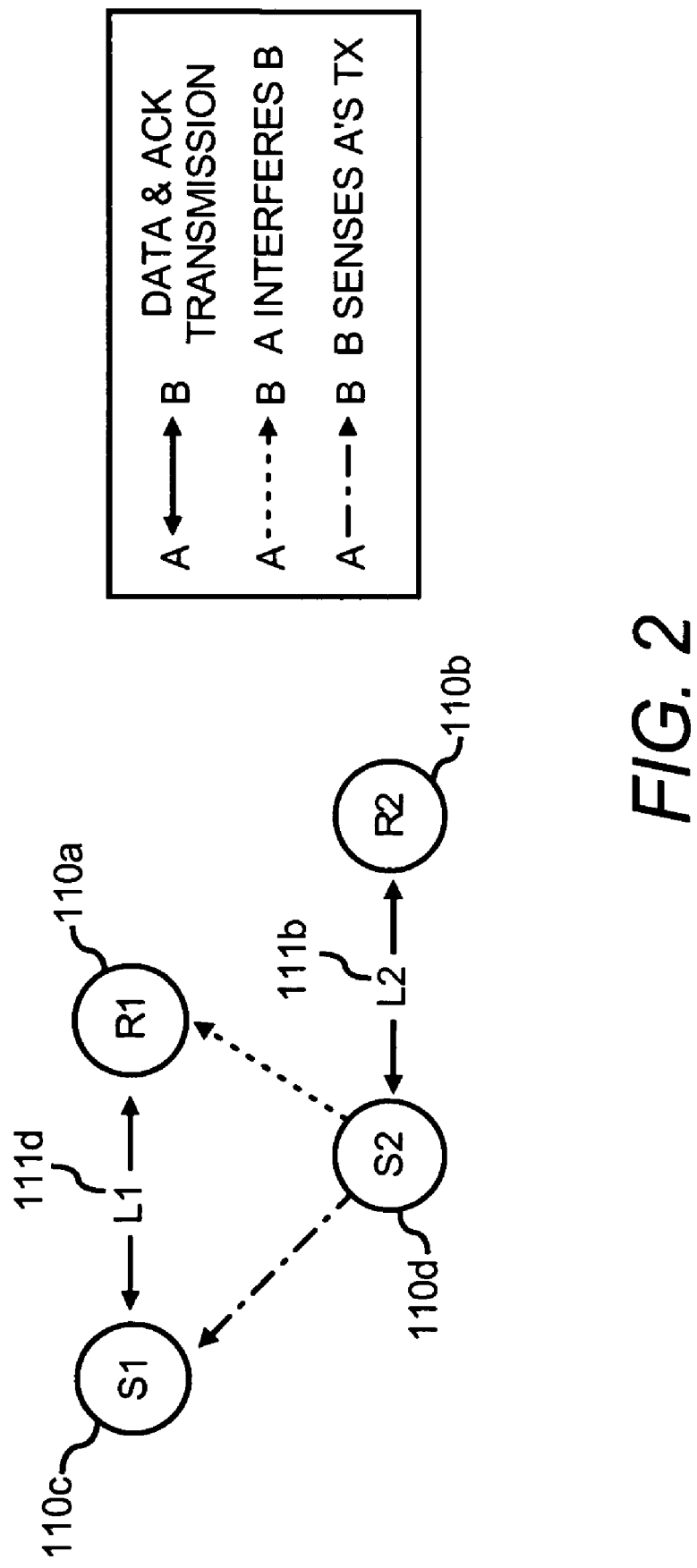
FIG. 2 illustrates two logical links in the WMN, according to an embodiment.

To describe CS and interference relationships, two links L1 and L2 that do not share end-points are considered, as shown in FIG. 2. The two links may be any of the links 111a-f in the WMN 114 shown in FIG. 1 that do not share endpoints, and the links are logical links, as described above with respect to links 111a-f. For example, links L1 and L2 shown in FIG. 2 may be links 111d and 111b from the WMN 114 shown in FIG. 1.

On L1 and L2, nodes S1 and S2 transmit data to nodes R1 and R2, respectively, as illustrated in FIG. 2, where S represents a sender and R represents a receiver. Arrows indicate the direction of data packets, interference signals, and sensed signals. The CS relationship between L1 and L2 is decided by the two senders S1 and S2, while the interference relationship depends on how one link affects the receiver of the other link, such as L1's effect on R2, and L2's effect on R1.

With regard to CS relationships, a mesh node withholds its transmission when it senses an ongoing transmission on the wireless medium. In the example shown in FIG. 2, when S1 senses S2's transmission, a CS relationship exists between L1 and L2, and the CS relationship is described as L2 is carrier sensed by L1. Also, as shown in FIG. 2, there may exist an asymmetric CS relationship between mesh nodes. For example, S1 senses S2 but S2 cannot sense S1.

Carrier sensing may affect transmission in another link. For example, in FIG. 2, S1 senses S2. Thus, if S2 is transmitting on the wireless medium, S1 detects the transmission and does not transmit at the same time to avoid data collision. In FIG. 2, when S2 is transmitting, S1 backs off. However, S2 does not sense S1 and thus does not attempt to avoid collision with S1's transmission. Hence, if S2 is continually transmitting, L1's bandwidth for S1's transmissions may be limited. For example, L1's throughput will be less because S1 may not be able to transmit at a desired rate due to sensing S2. Also, L1's goodput may be less because S2 cannot sense S1 and there may be data collisions between S1's and S2's transmissions.

With regard to an interference relationship, the interference relationship is independent from the CS relationship. In FIG. 2, if S1 and S2 simultaneously transmit, and S2's transmission hinders R1's successful reception of S1's packet, L1 is interfered by L2 (or S2) regardless of whether the interferer S2 is carrier sensed by S1 or not (S1 senses S2's transmission or not). As shown in FIG. 2, S2 interferes with S1 because R1 receives transmissions from both S1 and S2. R1 cannot receive packets from S1 and S2 simultaneously because of the single channel wireless medium. Thus, packets from S1 may not be received by R1 if R1 is receiving packets from S2.

Interference becomes problematic when the signal-to-interference/noise-ratio (SINR) at R1 goes below the required value due to S2's transmission. By ignoring the noise power which is usually much weaker than the intended signal (typically up to 70 dB difference), the SINR becomes the signal-to-interference-ratio (SIR). The SIR is defined in terms of a network metric, such as received signal strength (RSS) from S1 minus RSS from S2 in dB scale. If the SIR at R1 is below a threshold, S2 effectively interferes with R1's reception of packets from S1.

FIG. 2 illustrates one CS and interference state of links in the WMN 114. There are sixteen CS relationship and interference states ($2^4$) assuming every CS relationship and every interference relationship can be represented by a binary value, such as either yes or no for interference and either yes or no for carrier sense. Although carrier sensing and interference can be intermittent and are not binary, a binary value may be used to represent CS and interference relationships for simplicity. For example, in FIG. 2, S1 senses S2's transmission. The CS relationship between L1 and L2 is expressed as L1:$C_Y$, because S1 can sense S2, and as L2:$C_N$, because S2 senses S1. Similarly, if L1 suffers interference from link L2 (or node S2), the interference relationship is expressed as L:$F_Y$, and L2:$F_N$, because L2 does not suffer interference from L1. Thus, the CS and interference state shown in FIG. 2 is expressed as L:$C_Y F_Y$/L2:$C_N F_N$. The other sixteen CS and interference states may be similarly expressed.

According to an embodiment, bandwidth for links is estimated by categorizing CS and interference relationships for the links in one of the sixteen states. Furthermore, it has been determined through observed bandwidth measurements obtained in a mesh network testbed environment that when interference is present, five of the sixteen states may be used to categorize CS and interference relationships where estimating bandwidth may be difficult. This is due, in part, to the reason that many of the states are symmetric in terms of bandwidth when there is interference between the links. Considering the four states when no link is interfered with, such as when L1 does not interfere with L2, and L2 does not interfere with L1, bandwidth for each of the states is estimated based on the CS relationship for each of the four states. For example, if both links L1 and L2 sense each other, L1 and L2 share the channel evenly. If only one link senses the other link but not vice versa, there is uneven throughput. For example, the link sensing the other link may have a lower throughput. The amount of throughput for each link in this state may be based on the MAC protocol being used. If either link does not sense each other, the throughput may be 100% for each link.

Bandwidth estimation may be performed as described above for the four states when no link is interfered with. For the twelve remaining states when interference is present, bandwidth estimation may be symmetric for some of those states. For example, states where only L1 is interfered and states where only L2 is interfered result in symmetric throughput, i.e., the estimated throughputs are similar for both states. Thus, one of the two states may be ignored and all link relationships characterized by the ignored state are thus categorized into the non-ignored state for bandwidth estimation. As such, the four states when only L2 suffers interference and the four states when only L1 suffers interference have symmetric throughputs, so one of the sets of four states may be ignored and all link relationships characterized by the ignored set of states are thus categorized into one of the states in the non-ignored set.

The states where two senders sense each other have little interference. Throughput may be estimated at 50% for these states.

There are six remaining states shown in FIG. 3. States 1-3 represent states where there is unidirectional interference, which are shown as L2 interfering with L1, but cases where L2 unilaterally interferes with L1 may be categorized into one of these three states also. State 1 is the state shown in FIG. 2 and described above. State 2 is when S1 senses S2 but not vice versa. In state 2, L2 has greater throughput than L1 because S1 backs off when S2 is sending but not vice versa and also because of the interference. State 3 is when neither S1 nor S2 sense each other. L2 has greater throughput due to the interference in this state.

States 4 and 5 represent states where there is bidirectional interference. In state 4, S2 senses S1 but S1 does not sense S2. In this state, L1 has greater throughput. In the state labeled "symmetric to state 4", S1 senses S2 but S2 does not sense S1. This state and state 4 have symmetric throughputs, so cases represented by this state may be categorized into state 4 for estimating bandwidth. State 5 is the worst case where there is no sensing and bidirectional interference.

Bandwidth measurements were taken in a mesh network testbed environment for the five different states shown in FIG. 3. By controlling the antennas, transmission power, and node placement, the testbed embodied five network topologies corresponding to the five states in FIG. 3. For each state, goodput and throughput measurements were taken for user datagram protocol (UDP) broadcast and unicast of L1 and L2 in two scenarios: (1) when only each individual link is active and (2) when both links are simultaneously active. The applications on S1 and S2 generate UDP packets of 1000 bytes and continuously send them to R1 and R2 respectively, to make their link layer output queue non-empty. During the experiments, the PHY rate was fixed at 6 Mbps, which is the lowest and the most robust bit rate in IEEE 802.11a. Each broadcast/unicast transmission period was 30 seconds and used a clear 802.11a channel to avoid interference from other networks. Each link's interference-free throughput (sending traffic rate at a transmitter) and interference-free goodput (traffic rate successfully delivered to a receiver) were measured by activating one link while deactivating the other link. The measured interference-free throughput/goodput of broadcast/unicast was about 5 Mbps, which is the channel capacity. Given this testbed and the measured interference-free throughput/goodput of broadcast/unicast of about 5 Mbps, the interference-present throughput/goodput was measured for the five states and the results are shown in FIG. 4.

Figure 4:
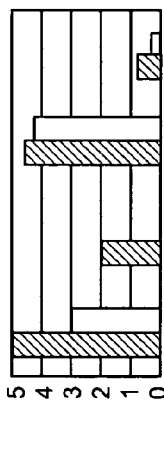
FIG. 4 illustrates bandwidth measurements for the states when the links are saturated, according to an embodiment.

FIG. 4 shows the throughput and goodput for saturated links for broadcast and unicast, which is when the senders for both links are continuously transmitting. In FIGS. 4 and 5, C represents carrier sense and F represents interference. For some states, a link's goodput is slightly smaller than its throughput (for example, L2 broadcast of state 3) even when it is free of interference from the other link. The packets still drop because of the following: first, a wireless channel is inherently exposed to a number of hindrance, such as microwave signals, movement of people, and topography; second, there is no explicit reliability mechanism for broadcast packets. For example, there is no ACKs and there is no retransmission for failed broadcasts. It was observed that the packet drop ratio increases as the RSS of the sender's signal falls off.

Understanding the broadcast throughput/goodput behavior helps comprehension of the effect of carrier sensing on transmission rate and the effect of interference on transmission failure because no MAC layer retransmission/backoff mechanism is applied for broadcast packets. For example, in unicast in the WMN 114, packets are also broadcasted on the medium in the WMN 114. However, the intended recipient responds with an ACK. If no ACK is received the sender may backoff for a predetermined period of time before re-broadcasting or for new broadcasts. In broadcast, there is no ACK signal and no backoff. Packets may be continually broadcasted, which may result in one link having less bandwidth. An analysis of the broadcast throughput/goodput measurements shown in FIG. 4 resulted in conclusions that may be used to estimate throughput and goodput. These conclusions are as follows.

With regard to broadcast, it was concluded that broadcast throughput is a function of carrier sensing. If a sender senses the other sender's transmission (i.e., C is $C_Y$), the throughput is about a half of the channel capacity. If the sender does not sense the other link (i.e., C is $C_N$), the throughput reaches its maximum channel capacity, regardless of whether the other sender senses its transmission or not.

It was also concluded that interference is prevalent when at least one sender is hidden. For example, if L1 is interference-free or both senders sense each other's transmission, L1's broadcast goodput is almost the same as its broadcast throughput. In contrast, if one or both links are hidden (i.e., C is $C_N$ for one or both links), the interfered link's goodput is affected by the interferer's throughput. Thus, the commonly used term hidden interference should include the cases when the sender is hidden from the interferer, such as in state 2, as well as when the interferer is hidden from the sender, such as in state 1. If the interferer's throughput reaches the channel capacity, the interfered link's goodput becomes almost zero, such as shown in the broadcast measurements for states 2, 3 and 4 in FIG. 4. In FIGS. 4 and 5, if the goodput or throughput is not shown for a link in a graph for a state, the goodput or throughput is zero or almost zero.

With regard to unicast, it was concluded that the interference-free link gets most of the bandwidth. That is if one link suffers interference while the other does not, the interference-free ($F_N$) link takes most, if not all, of the channel capacity. Note that in these states (states 1, 2 and 3), the interference-suffering ($F_Y$) link's throughput is very small, such as 0.2 to 0.8 Mbps and its goodput is almost zero. This is evident in state 1, where the broadcast goodput measurements show a nearly fair share between the two links whereas the unicast goodput share is extremely unfair. It is due to the backoff mechanism, for example, of the 802.11 MAC protocol. For state 1 with broadcast/unicast transmissions, S1 transmits much more aggressively than S2 because it does not sense S2's transmission, while S2 senses S1's transmission and yields the channel during S1's transmission time. Hence, the observed L1's broadcast throughput is greater than L2's, and its broadcast goodput is also somewhat greater than L2's despite being interfered by L2's transmission. However, in the unicast traffic, the situation becomes different. The sender doubles its contention window (Cwin) whenever it does not receive an ACK for a transmitted unicast packet, and waits for a randomly selected time slots between 0 and its Cwin before the retransmission. Due to this exponential backoff mechanism, a vicious cycle forms in state as follows: 1) The sender S1 of the interfered link L1 increases its Cwin; 2) S1's packet transmission rate (throughput) decreases; 3) S2 gets more chances to transmit while S1 refrains its transmission due to the increased Cwin (S2's throughput hence increases); and 4) as the interferer S2's throughput increases, the packet drop rate of L1 increases, and S1's Cwin is doubled again by the backoff algorithm.

As the above cycle repeats, L1's unicast goodput drastically drops and reaches near zero while L2 takes most of the channel capacity. This result contrasts that of broadcast, because there is no explicit ACK mechanism for broadcast packets. That is the sender does not know whether its broadcast packet is collided and no backoff occurs. That is why L1's broadcast throughput in the states 1, 2 and 3 does not decrease despite packet collisions resulting from interference.

With regard to unicast again, it was concluded that if both links suffer interference, the link that does not sense the other link gets most of the channel capacity. The link sensing the other link's transmission, for example L2 in state 4, begins to yield the channel which in turn, decreases the other link L1's collision probability. L2's collision probability however, remains high as L1 does not sense L2 and hence does not yield the channel. Thus, S2's Cwin increases faster than S1's. L1 takes most of the channel capacity and L2's goodput reaches almost zero.

With regard to unicast again, it was concluded that if both links suffer interference and are hidden from each other, goodput of both links is nearly zero, such as shown with respect to state 5. The goodput degradation becomes intensified because of saturated traffic from both senders and hence further interference. It was also noted that the aggregate, unicast, goodput is similar to the channel capacity if any one of the senders senses the other. This is true even in some cases when both links interfere with each other, as shown in state 5. Because of the backoff mechanism, L2 decreases its transmission rate, which helps L1 to survive interference.

FIGS. 4 and 5 also show frequency for each state. This frequency is the occurrence frequency. In the testbed, measurements were taken of how frequently each of the five states occurred without controlling the antenna/node positions and transmission power. Pair of links where chosen for the measurements, whereby each link in each pair had greater than 2.5Mbps interference-free goodput. A total of 152 such pairs were identified. The frequency is the occurrence percentage of each state from the 152 pairs in the testbed, such as (the number of occurrences for a particular state)/152. The percentage in parentheses next to the occurrence frequency is (the number of occurrences for a particular state)/69, where 69 is the total number of occurrences of the five states for the 152 pairs.

BIR and LIR are good indicators for the level of interference between the two links but are not good indicators of the goodput share for each link. BIR and LIR only indicate the aggregate goodput of both receivers in the presence of interference. They do not provide the information of each link's goodput. Based on the measurements shown in FIG. 4, it was concluded that the link goodput share can be extremely unfair when BIR and LIR show equal aggregate goodput. In FIG. 4, for example, LIR is almost equal (about 0.5) for all cases except for state 5. However, L2 takes most of the channel capacity in states 1, 2 and 3, while L1 takes most of the channel capacity in state 4. As described herein, bandwidth estimation according to an embodiment takes into consideration the unequal goodput share in the presence of interference.

As described above, FIG. 4 shows the throughput and goodput for saturated links for broadcast and unicast, which is when the senders for both links are continuously transmitting. Link behavior for unsaturated links was also investigated on the testbed. Two different traffic rates of 2.5 Mbps and 1 Mbps were used for the unsaturated cases.

For the 1 Mbps unsaturated case, the measurements indicate broadcast/unicast throughput/goodput range between 0.8 and 1 Mbps in most states except for the state when L1 and L2 interfere and sense each other (L:$C_Y F_Y$/L2:$C_Y F_Y$). The goodputs for L1 and L2 are 0.7 and 0.5 Mbps in that state. Generally, two links L1 and L2 have a fair share of goodput regardless of the relation between interference and carrier sense when the traffic load is very light, such as 1 Mbps.

When the traffic load is heavier, such as for the unsaturated, 2.5 Mbps case, the share of goodput may not be equal for the links. FIG. 5 shows the throughput and goodput for unsaturated links for broadcast and unicast, where the traffic rate is 2.5 Mbps. Based on the measurements, it was concluded that the links that had low goodput in the saturated testbed case have greater goodput (up to 1.9 Mbps) when the traffic load is lighter. Furthermore, the aggregate unicast goodput is almost as high as the aggregate goodput from the saturated testbed case. This is reflected when comparing states 1 and 3 from FIGS. 4 and 5. In state 5 when both links are hidden from each other and both links interfere with each other, as the traffic decreases, for example from 5 Mbps to 2.5 Mbps to 1 Mbps, the link goodput increases.

Also, the measurements shown that packet drop rate is significantly reduced with unsaturated traffic. In state 1, L1 suffers (hidden) interference from L2 and its unicast throughput is smaller than its broadcast throughput. That is, S1 performs backoff depending on L2's traffic rate. However, L1's unicast goodput is equal to the unicast throughput while broadcast goodput is less than half of the broadcast throughput. With unsaturated interfering traffic, the transmission failure rate is not expected to be severely high enough to cause packet drops. Because the interfering L2's traffic rate is unsaturated, L2 does not exploit all the channel idle time during L1's backoff. This allows L1 to use some portion of the channel.

As described above, bandwidth behavior, such as throughput or goodput behavior, can be explained by the CS and interference relationships for links, as well as the traffic rate. According to an embodiment, CS and interference relationships are determined for links based on network metric measurements, and bandwidth is estimated by characterizing the determined CS and interference relationships in one of the five states shown in FIGS. 3-5.

Referring to FIG. 1, the mesh nodes 110a-d perform network metric measurements. For example, the network metric is received signal strength (RSS). It will be apparent to one of ordinary skill in the art that other network metrics may be used.

In one embodiment for performing RSS measurements in the WMN 114, every mesh node broadcasts hello messages, for example, at the lowest PHY rate, which was 6 Mbps in the 802.11a testbed. The mesh manager 130 schedules each mesh node's broadcast time so the hello messages do not collide. In 802.11, the failure of four consecutive retransmissions indicates a packet drop, which may be reported to the mesh manager 130 along with the RSS measurements.

Using a conventional wireless interface at the mesh nodes 110a-d, such as 802.11 wireless local area network (LAN) cards, an RSS value is determined when a received packet is correctly decoded. Thus, mesh nodes within a broadcasting node's interference range but outside its reception range cannot be accounted for in the RSS measurements. To address this problem, high-power and normal-power hello message broadcasts are performed. Each mesh node performs a hello message broadcast twice; once with high and once with normal power levels. The normal power level is used for actual data communications, and the high power level is a predetermined amount, Y dB, higher than the normal power level. If a normal power hello message is received, the receiving mesh node measures the RSS and reports the RSS to the mesh manager 130 without considering the high-power hello message. If only a high-power hello message is received, the receiving mesh node measures the RSS, subtracts Y dB, and reports the result to the mesh manager 130.

The testbed measurements show that when the high-power is Y dB higher than the normal-power level, the RSS of a high-power packet falls in the range of Y±1 dB higher than that of a normal-power packet. When signal propagation environments do not change, signal attenuation for a given link is almost constant regardless of the transmission power level.

All the mesh nodes 110a-d may perform the hello message broadcasts and receiving mesh nodes measure the RSS of received packets and send the RSS measurements to the mesh manger 130 at the management sever 120. The mesh manager 130 stores the RSS measurements, shown as measurements 133, in the data store 131. The mesh manager 130 may include one or more software applications performing the functions described herein.

Once the RSS measurements are collected at the management server 120, the mesh manger 130 determines the CS and interference relationships as follows. The CS relationship is determined by comparing the RSS with the CS threshold for two links. If the RSS is greater than the CS threshold, the mesh manger 130 determines that the receiver senses the sender's transmission; otherwise it cannot. To determine the interference relationship, the mesh manager 130 calculates SIR as "RSS from the sender minus RSS from the interferer" and compares the SIR with the interference threshold to determine whether there is interference.

After the CS relationship and the interference relationship are determined for two links, the mesh manager 130 matches the determined relationships to a state in the bandwidth estimation table 132. The bandwidth estimation table 132 includes the relationships for each of the states 1-5 shown in FIG. 3, and link bandwidth estimations for each of the states, which may be in terms of goodput or throughput, for each state. Examples of link bandwidth estimations that may be provided in the bandwidth estimation table 132 are shown in FIGS. 4 and 5. In the bandwidth estimation table 132, link bandwidth estimations may be provided for saturated and unsaturated cases, as well as unicast, broadcast, or multicast cases for each state. The mesh manager 130 matches the determined relationships for a pair of links with relationships for a state stored in the bandwidth estimation table 132, and then uses a link bandwidth estimation for the matched state to estimate link bandwidth for each link.

The bandwidth estimation table 132, for example, is populated with bandwidth values determined from a testbed that simulates the actual wireless network. For example, the traffic rate of the wireless network is determined, possibly for different time periods. Also, the capacity of the wireless network, which may vary based on the MAC protocol being used or other factors, is also determined. The traffic rate for a time period and the capacity are simulated in the testbed to generate and store the bandwidth measurements for each state in the bandwidth estimation table 132. Bandwidth measurements may be stored for different traffic rates and different capacities. Then, to perform bandwidth estimation, the traffic rate and the capacity of the wireless network, along with the state of the links, are matched with the same state and the same or similar traffic rate and capacity in the table 132 to retrieve the relevant link bandwidth estimations from the table 132.

As described above, the bandwidth measurements in the table 132 may reflect some generalizations with regard to the bandwidth of two links not sharing endpoints when there may be intereference or carrier sensing between the links. In four states when no link is interfered, bandwidth for each of the states is estimated based on the CS relationship. For example, if both links L1 and L2 sense each other, L1 and L2 share the channel evenly. If only one link senses the other link but not vice versa, there is uneven throughput. If either link does not sense each other, the throughput may be 100% of the channel capacity for each link.

For the states where two senders sense each other but have little interference, the throughput may be estimated at 50%.

For unidirectional interference, in state 1, where only one link senses and the link that senses is interfered with, the non-interfered link which does not sense gets the most throughput and goodput for broadcast. For unicast, L1's unicast goodput drastically drops and reaches near zero while L2 takes most of the channel capacity. In state 2 for broadcast, L2 has greater throughput than L1 because L1 backs off when L2 is sending but not vice versa and also because of the interference. In state 3 for broadcast and unicast, when neither L1 nor L2 sense each other, L2 has greater throughput due to the interference in this state.

For bidirectional interference, in state 4, when S2 senses S1 but S1 does not sense S2, L1 has greater throughput for broadcast and unicast. State 5 is the worst case where there is no sensing and bidirectional interference. For broadcast and unicast, throughput is high but goodput is poor.

Figure 6:
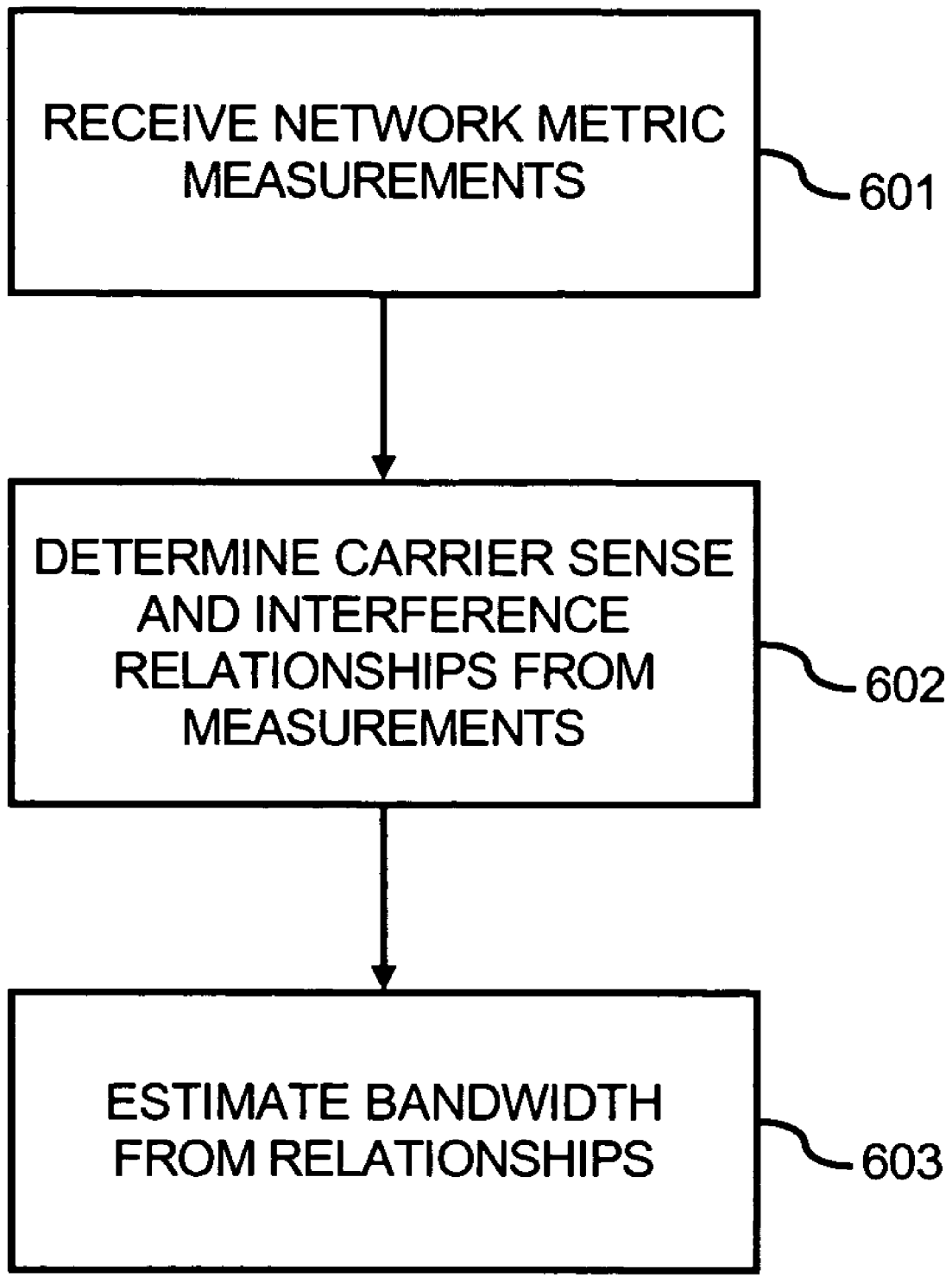
FIG. 6 illustrates a flowchart of a method for estimating bandwidth, according to an embodiment.

FIG. 6 illustrates a method 600 for estimating bandwidth, according to an embodiment. The method 600 is described with respect to FIGS. 1-5 by way of example and not limitation. The method 600 may be performed in systems other than shown in FIG. 1.

At step 601, the mesh manager 130 shown in FIG. 1 receives network metric measurements and stores the measurements in the data store 131.

At step 602, the mesh manager 130 determines CS and interference relationships for a pair of links, such as links 111b and 111d shown in FIG. 1, from the received measurements.

At step 603, the mesh manager 130 estimates bandwidth from the determined relationships. For example, the determined CS and interference relationships are matched with a state in the bandwidth estimation table 132, and bandwidths in the table for the state may be used as the bandwidth estimations or bandwidth estimations may be calculated from the bandwidths in the table for the matching state.

The link bandwidth estimation described in the method 600 and other steps and embodiments described herein may be used for WMNs or wireless networks that are not WMNs. The link bandwidth estimation is applicable to any shared broadcast medium wireless network where there are two links that do not share endpoints. This includes ad-hoc networks and other local area wireless networks.

Figure 7:
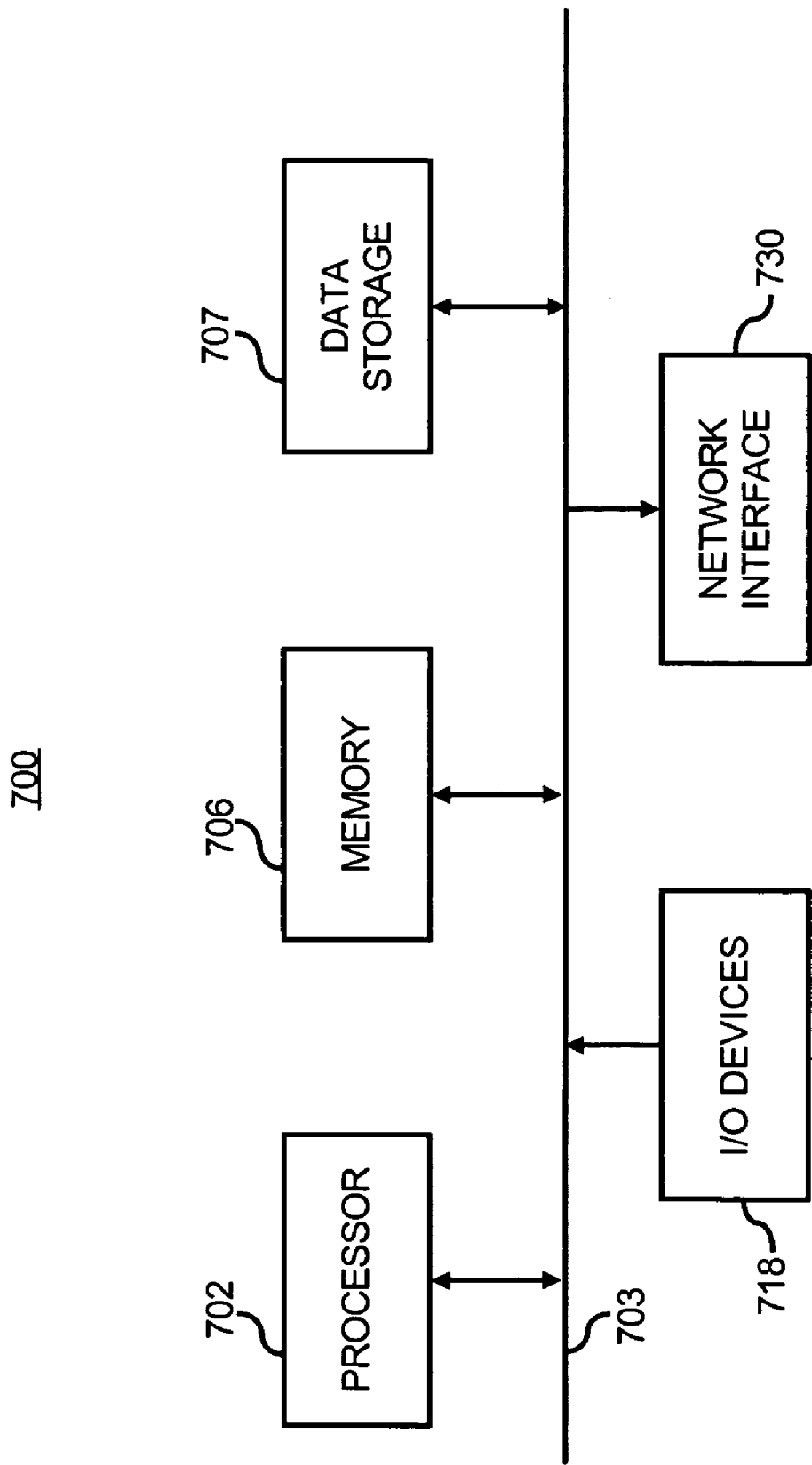
FIG. 7 illustrates a computer system, according to an embodiment.

FIG. 7 illustrates a schematic block diagram of a computer system 700, according to an embodiment. The computer system 700 may include one or more processors, such as processor 702, providing an execution platform for executing software. The computer system 700 also includes a memory 706, which may include Random Access Memory (RAM) where software is resident during runtime. The computer system 700 also includes data storage 707, which may include one or more of ROM (read only memory), EPROM (erasable, programmable ROM), EEPROM (electrically erasable, programmable ROM) hard disks, etc. A bus 703 is also shown.

A user interfaces with the computer system 700 with one or more input/output (I/O) devices 718, such as a keyboard, a mouse, a stylus, a display, and the like. A network interface 730 is provided for communicating with other computer systems. It will be apparent to one of ordinary skill in the art that FIG. 7 is meant to illustrate a generic computer system. Any type of computer system may be used. Furthermore, one or more components of the components of the computer system 700 are optional, such as the display and input devices, and other types of components may be used or substituted as is known in the art.

In one embodiment, the computer system 700 represents a hardware platform for the management server 120. The mesh manager 130 may include one or more applications stored in the data storage 707 and resident in the memory 703 during runtime, such as when the applications are executed by the processor 702. The data store 131 shown in FIG. 1 may include the data storage 707.

In another embodiment, the computer system 700 represents a mesh node in the WMN 114. The network interface 730 may include more than one interface, such as an interface for communicating with clients, an interface for communicating with other mesh nodes and/or an interface for connecting to the Internet if the node is also a gateway portal.

One or more of the steps of the methods 600 and other steps described herein may be implemented as software embedded or stored on a computer readable medium, such as the memory 706 or data storage 707, and executed by the processor 702. The steps may be embodied by a computer program, which may exist in a variety of forms both active and inactive.

For example, there may exist as software program(s) comprised of program instructions in source code, object code, executable code or other formats for performing some of the steps when executed. Any of the above may be stored on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated herein may be performed by any electronic device capable of executing the above-described functions.

Those skilled in the art will recognize that variations of the embodiments are possible within the scope as defined in the following claims and their equivalents.

What is claimed is:

1. A method of estimating bandwidth for logical links in a wireless network using a shared, broadcast, medium, the method comprising:
   receiving network metric measurements from nodes in the logical links;
   determining a carrier sense relationship between the logical links from one or more of the network measurements;
   determining an interference relationship between the logical links from one or more of the network measurements, wherein the interference relationship is independent from the carrier sense relationship; and
   using the determined carrier sense relationship and the determined interference relationship to calculate an estimated bandwidth for each of the links.

2. The method of claim 1, wherein the network metric is received signal strength (RSS) and determining a carrier sense relationship comprises:
   for each link, comparing an RSS for a node in the link receiving a signal from a node in a second link of the links to a threshold; and
   determining whether the node in the link carrier senses the node in the second link based on the comparison.

3. The method of claim 1, wherein the network metric is RSS and determining an interference relationship comprises:
   calculating a signal to interference (SIR); and comparing the SIR with an interference threshold to determine whether there is interference between the links.

4. The method of claim 3, wherein calculating an SIR comprises:
   for each link of the links, calculating an SIR between two of the links, wherein SIR is RSS from a sender minus RSS from an interferer.

5. The method of claim 1, wherein calculating the estimated bandwidth for each of the links comprises:
   determining a state of the links from the carrier sense and interference relationships; and
   estimating the bandwidths from the state.

6. The method of claim 5, wherein determining a state comprises:

identifying the state of the links from predetermined states using the determined carrier sense and interference relationships, wherein each of the predetermined states has associated bandwidths for the links determined from observed measurements.

7. The method of claim 6, wherein calculating the estimated bandwidth for each of the links comprises:
estimating the bandwidth for each of the links from the associated bandwidth for the identified state, wherein the bandwidth for each of the links comprises a rate of bytes received at a receiver.

8. The method of claim 6, wherein the predetermined states comprise different possible carrier sense relationships and interference relationships between links in a shared broadcast medium network using only a single channel for broadcasts between nodes in the network.

9. The method of claim 6, wherein each predetermined state indicates whether or not a link in the network carrier senses another link in the network and whether or not a link in a network interferes with another link in the network.

10. The method of claim 1, wherein calculating the estimated bandwidth for each of the links based on the determined carrier sense relationship and the determined interference relationship further comprises:
determining broadcast throughput as a function of carrier sensing for a pair of links L1 and L2, each having a sender S1 and S2 respectively, and each having a receiver R1 and R2 respectively that are all different nodes;
wherein if S1 carrier senses S2's transmission, the throughput of L1 is about a half of a channel capacity for L1 and L2;
wherein if S1 does not carrier sense S2's transmission, the throughput of L1 reaches a maximum channel capacity, regardless of whether S2 senses S1's transmission or not.

11. The method of claim 1, wherein calculating the estimated bandwidth for each of the links based on the determined carrier sense relationship and the determined interference relationship further comprises:
determining broadcast throughput and good put for a pair of links L1 and L2 when interference is prevalent, each of L1 and L2 having a sender S1 and S2 respectively, and each having a receiver R1 and R2 respectively that are all different nodes;
wherein if L1 is interference-free, L1's broadcast goodput is almost the same as its broadcast throughput;
wherein if one or both links L1 and L2 do not carrier sense each other, the interfered link's goodput is affected by the interferer's link throughput, and the as the interferer's link throughput reaches a channel capacity, the interfered link's goodput becomes almost zero.

12. The method of claim 1, wherein calculating the estimated bandwidth for each of the links based on the determined carrier sense relationship and the determined interference relationship further comprises:
determining unicast throughput and goodput for a pair of links L1 and L2 when interference is prevalent, each of L1 and L2 having a sender S1 and S2 respectively, and each having a receiver R1 and R2 respectively that are all different nodes;
wherein if one link of the links suffers interference while the other link does not, the interference-free link takes most of the channel capacity;
wherein if both links suffer interference, and L1 carrier senses L2, L2 gets most of the channel capacity;
wherein if both links suffer interference and do not carrier sense each other, goodput of both links is nearly zero.

13. An apparatus operable to estimate bandwidth for logical links in a wireless network using a shared, broadcast, medium, the apparatus comprising:
a data store storing network metric measurements for nodes in the network; and
a processor determining a carrier sense relationship and an interference relationship between the logical links from the measurements, the processor using the determined carrier sense and interference relationships to calculate an estimated bandwidth for each of the links, wherein the interference relationship is independent from the carrier sense.

14. The apparatus of claim 13, wherein the network metric measurements are RSS measurements.

15. The apparatus of claim 13, wherein the bandwidth estimations comprise an estimation of a rate of bytes received at a receiver for each link.

16. A computer readable storage device storing executable instructions which, when executed by a processor, causes the processor to perform a method of estimating bandwidth for logical links in a wireless network using a shared, broadcast, medium, the method comprising:
receiving network metric measurements from nodes in the logical links;
determining a carrier sense relationship between the logical links from one or more of the network measurements;
determining an interference relationship between the logical links from one or more of the network measurements, wherein the interference relationship is independent from the carrier sense relationship; and
using the determined carrier sense relationship and the determined interference relationship to calculate an estimated bandwidth for each of the links.

17. The computer readable storage device of claim 16, wherein calculating the estimated bandwidth for each of the links comprises:
determining a state of the links from the carrier sense and interference relationships; and
estimating the bandwidths from the state.

18. The computer readable storage device of claim 17, wherein determining a state comprises:
identifying the state of the links from predetermined states using the determined carrier sense and interference relationships, wherein each of the predetermined states has associated bandwidths for the links determined from observed measurements; and
estimating a bandwidth for each of the links comprises estimating the bandwidth for each of the links from the associated bandwidth for the identified state.

* * * * *

UNITED STATES PATENT AND TRADEMARK OFFICE
CERTIFICATE OF CORRECTION

| | |
|---|---|
| PATENT NO. | : 8,045,562 B2 |
| APPLICATION NO. | : 11/590148 |
| DATED | : October 25, 2011 |
| INVENTOR(S) | : Jeongkeun Lee et al. |

It is certified that error appears in the above-identified patent and that said Letters Patent is hereby corrected as shown below:

In column 13, line 50, in Claim 11, delete "and the as the" and insert -- and as the --, therefor.

In column 14, line 20, in Claim 13, delete "sense." and insert -- sense relationship. --, therefor.

Signed and Sealed this
Nineteenth Day of June, 2012

David J. Kappos
*Director of the United States Patent and Trademark Office*